July 3, 1956 B. L. McARDLE 2,753,452

SYNCHRONIZING SIGNAL SEPARATION SYSTEM

Filed Oct. 12, 1949 5 Sheets-Sheet 1

INVENTOR.
BERYL L. McARDLE

BY Albert R. Hodges
ATTORNEY

INVENTOR.
BERYL L. McARDLE
BY Albert R. Hodges
ATTORNEY

INVENTOR.
BERYL L. McARDLE
BY Albert R. Hodges
ATTORNEY

July 3, 1956 B. L. McARDLE 2,753,452

SYNCHRONIZING SIGNAL SEPARATION SYSTEM

Filed Oct. 12, 1949 5 Sheets-Sheet 4

INVENTOR.
BERYL L. McARDLE

BY Albert R. Hodges
ATTORNEY

INVENTOR.
BERYL L. McARDLE
BY Albert R. Hodges
ATTORNEY 2,753,452

SYNCHRONIZING SIGNAL SEPARATION SYSTEM

Beryl L. McArdle, Rochester, N. Y., assignor, by mesne assignments, to General Dynamics Corporation, a corporation of Delaware Application October 12, 1949, Serial No. 121,001

4 Claims. (Cl. 250—27)

This invention relates to synchronizing signal separation systems, and more particularly to such systems for use in secret communication systems. Although not limited thereto, the arrangements of the present invention are particularly adapted for use in communication systems of the type disclosed and claimed in application Serial No. 104,235, Merwin J. Larsen, filed July 12, 1949, and assigned to the same assignee as the present application.

In communication systems of the type disclosed in the above-mentioned co-pending patent application, for example, the signal which is transmitted and received comprises a composite having intelligence and synchronizing components which are time-multiplexed, that is, arranged in successive time-position sequence. The intelligence component is transmitted and received during a series of main sampling intervals, and the synchronizing component is transmitted and received during the intervals falling within the time periods lying between the main sampling intervals. This will be clear from a specific example. Let it be assumed that the synchronizing signal comprises a sinusoidal wave having a frequency of 420 cycles a second. Each period of this wave is divided into 24 equal intervals, successive ones of which are employed for transmitting twelve separate multiplexed intelligence signal components. The remaining intervals of the synchronizing signal period are then available for the transmission of a "chopped" sinusoidal wave comprising a plurality of segments.

In systems such as those briefly discussed above, the problem of securing synchronization between the transmitter and one or more receivers is two-fold. The first element of the problem is to cause a receiver, normally at rest, to begin operating in accordance with the synchronizing component of the transmitted signal. After this is accomplished, it is necessary to insure that the receiver will continue to operate in step, with respect to phase, with the synchronizing component of the transmitted signal and that this phase relationship will not be disturbed by the presence or absence of modulation of the intelligence component of the transmitted signal or by the presence or absence of various other spurious signals which may be received, as for example "jamming" signals frequently encountered when communication systems of the type herein contemplated are employed for military purposes.

Thus it will be seen that a successful synchronizing signal separation system must be one which is normally receptive and awaiting the transmission of a composite signal including a synchronizing component. Upon the receipt of such a signal, the synchronizing signal separation system must be capable of recognizing and utilizing the synchronizing component, both to initiate operation of the receiver in proper phase relationship to the operation of the transmitter and to insure, so far as possible, that spurious signals which may be intercepted will not interfere with the continuous maintenance of proper synchronization.

It is an object of the present invention, therefore, to provide an improved synchronizing signal separation system which is compact, efficient, and rapid in operation.

Another object of the present invention is the provision of a synchronizing signal separation system capable of providing, for use at the receiver, a synchronizing signal which is substantially free from spurious responses due to the intelligence signal being simultaneously transmitted or to other causes.

Still another object of the present invention is to provide an improved clamping and sampling circuit which is adapted to handle a wide range of input signals, and hence is especially adapted for use in a synchronizing signal separation system of the general type herein contemplated.

In accordance with the present invention, there is provided, for use in a communication system for transmitting and receiving a composite signal having samples of intelligence and synchronizing components in successive time-position sequence and in which the synchronizing component has a fundamental frequency, means for separating this fundamental frequency. These means comprise a combination of a plurality of separate elements. There is provided an initially conductive sampling and clamping circuit the output of which feeds into a network having maximum response at the fundamental frequency of the synchronizing component. This network in turn supplies means for developing a square wave having the same frequency as the synchronizing component. Means are then provided for converting the square wave into a substantially sinusoidal wave. This sinusoidal wave is supplied to a phase multiplier adapted to develop a plurality of waves of equally spaced phase but each of the same frequency as the sinusoidal wave. The plurality of waves is utilized to provide a train of equally spaced pulses, and means are provided for rendering the sampling and clamping circuit non-conductive following each of these pulses.

In general, the synchronizing component of the transmitted signal is preferably sinusoidal, but it will be understood that any other suitable wave form may be used with appropriate changes in the terminal equipment at the transmitter and the receiver, without departing from the scope of the present invention.

The above and other objects and features of the present invention will be better understood by referring to the following description taken in connection with the accompanying drawings, in which.

Figure 2:
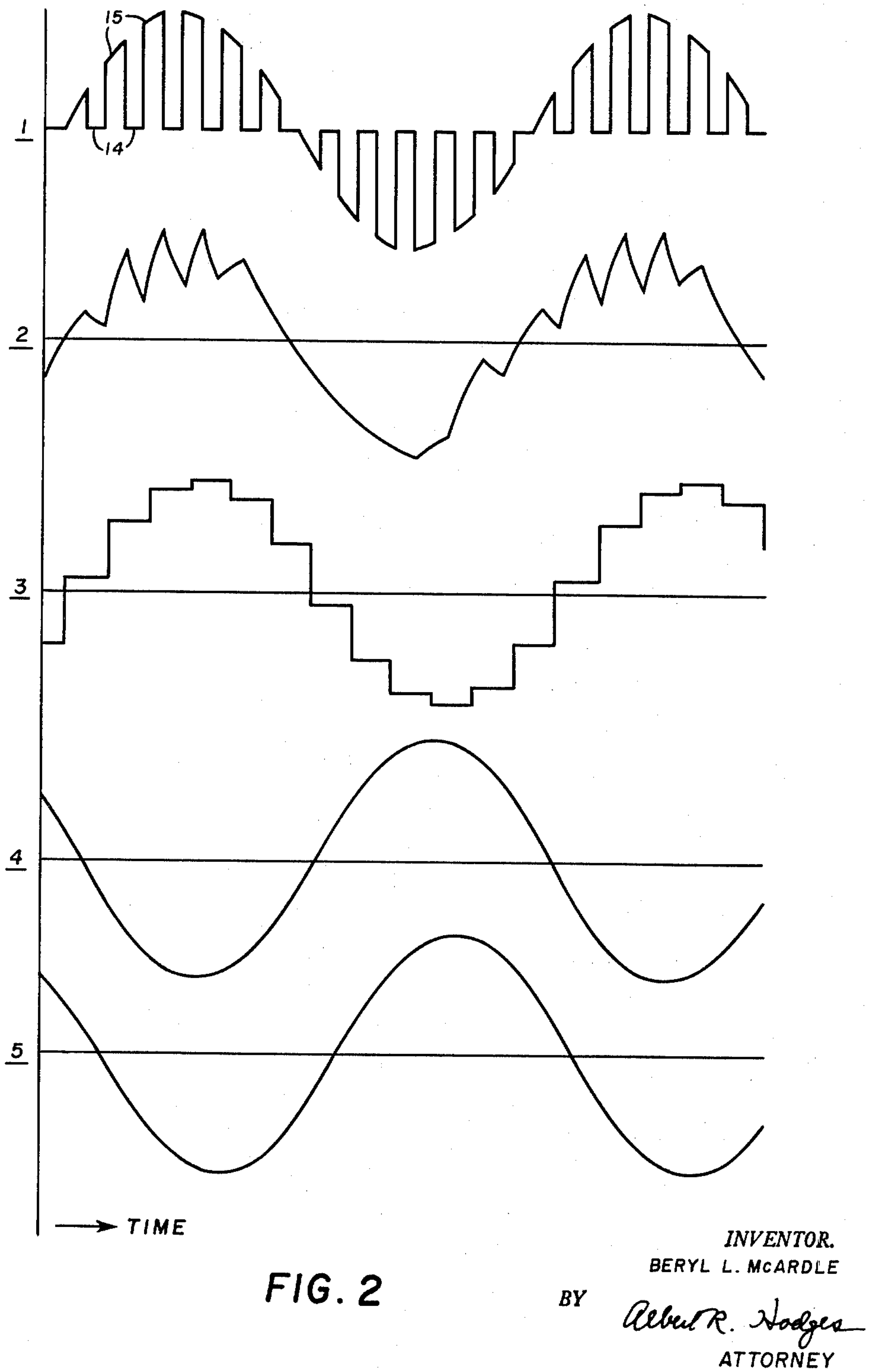
Figs. 2–4 are graphical representations, to a common time base, of the waveforms which exist in various portions of the system of Fig. 1.
Figure 3:
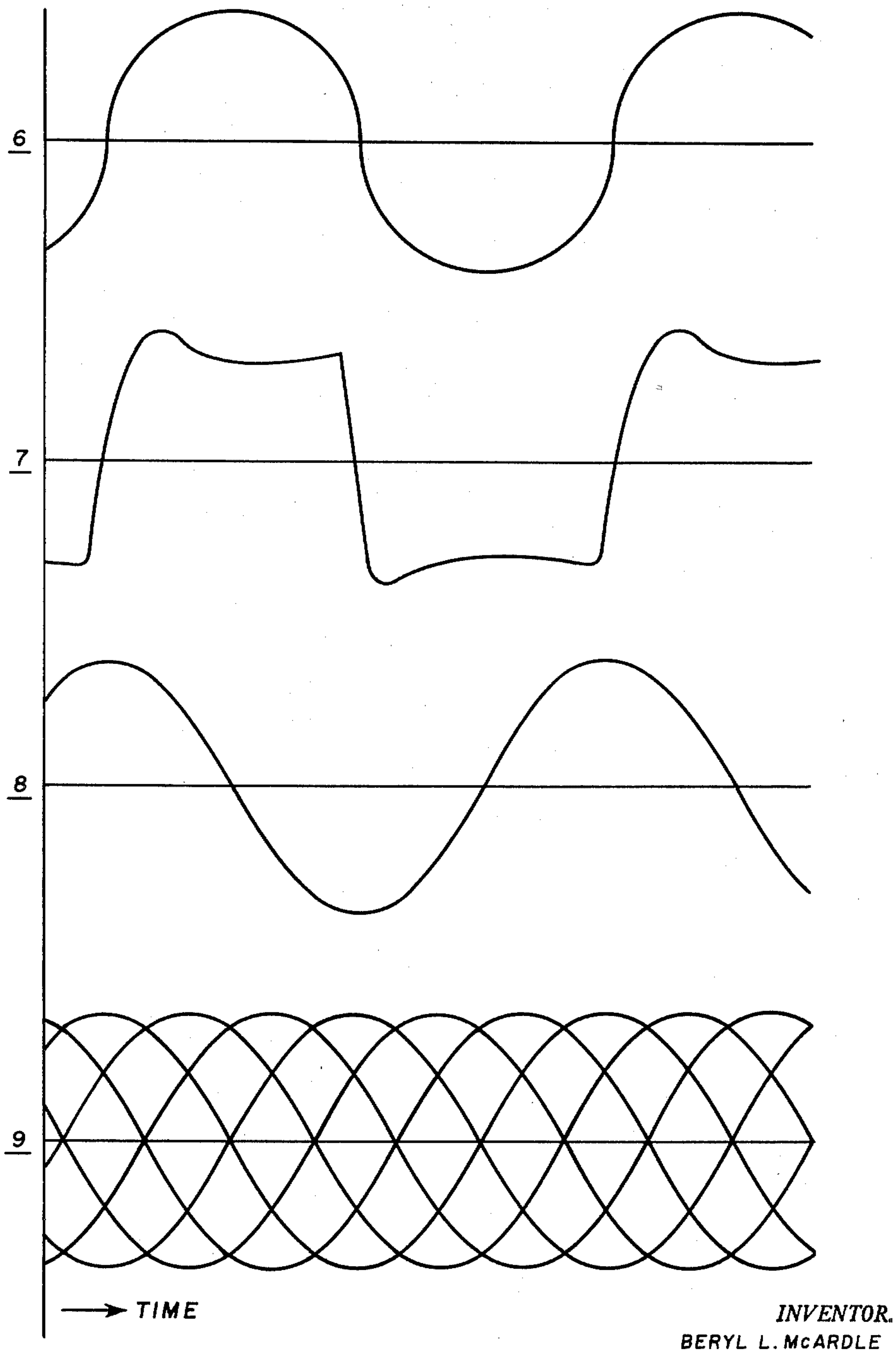
Figure 4:
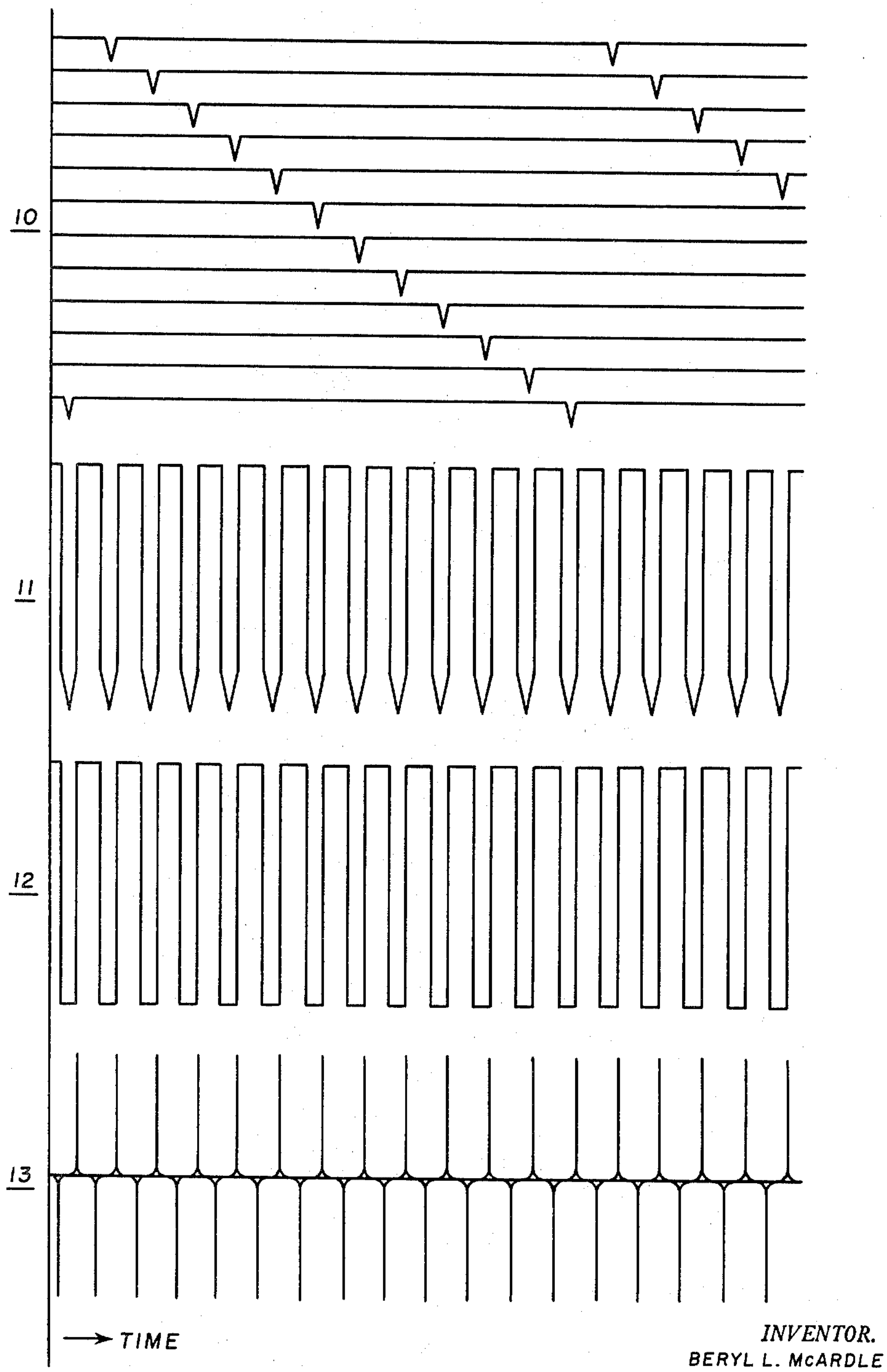

In the drawings, the encircled reference numerals refer to the corresponding curves or wave shapes of Figs. 2–4. Reference will be made to these curves throughout the following description as an aid to a better understanding of the operation of the present invention.

Figure 1:
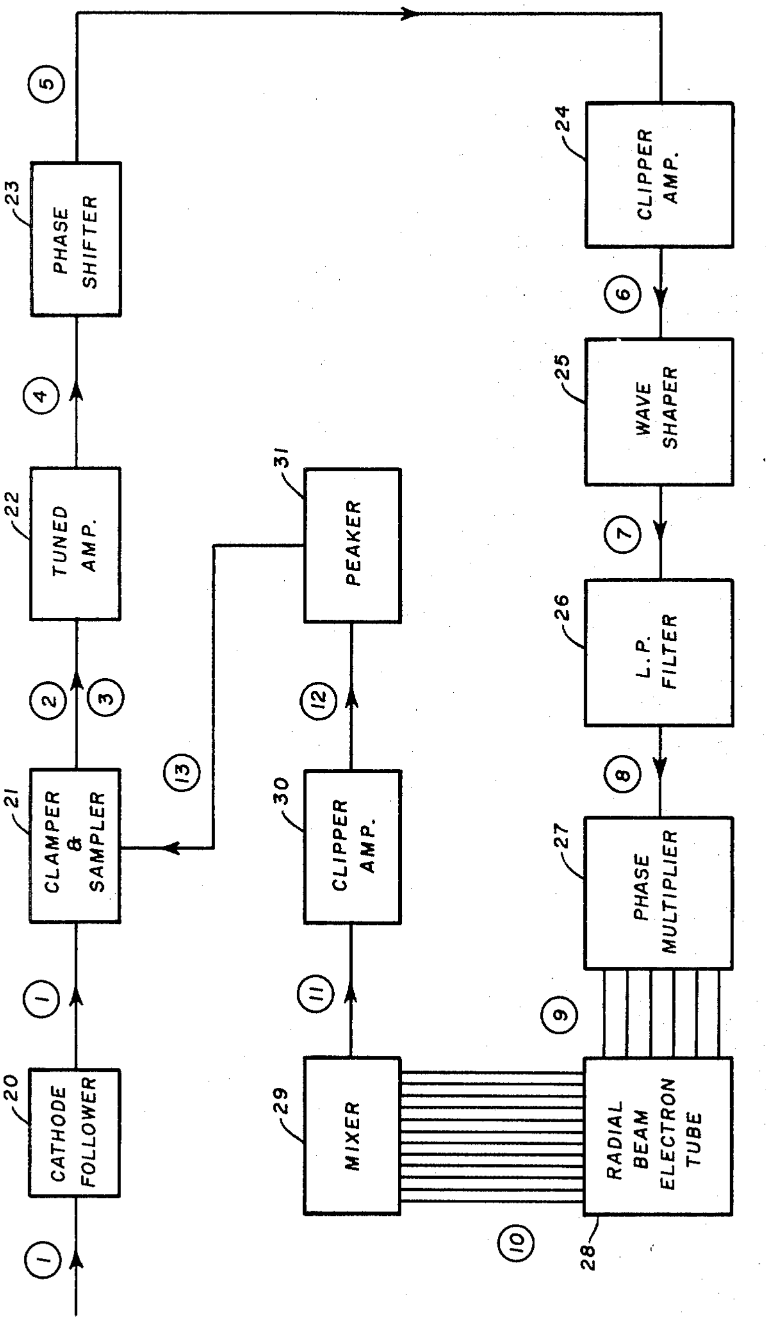
Fig. 1 represents, in block form, a synchronizing signal separation system in accordance with the present invention.

Referring now to Fig. 1, the received input signal, represented by curve 1, is applied to a cathode-follower unit 20. This curve is seen to comprise a composite signal having intelligence intervals represented by the spaces 14, and a synchronizing signal component illustrated by the portions 15. It will be apparent that the portions 15 together comprise a "chopped" sinusoidal wave which is, for purposes of example, assumed to be the fundamental frequency of the synchronizing component. This wave is actually transmitted as twelve separate pulses, the space between these pulses being available for the transmission of intelligence. The pulses are effectively amplitude-modulated by the fundamental frequency. In the system disclosed in the above-mentioned patent application, for example, the intelligence intervals 14 would be occupied by individual elements of a multiplexed intelligence signal, twelve of these elements being transmitted in the period occupied by one cycle of the fundamental frequency of the sinusoidal synchronizing wave. For the sake of clarity, the intelligence modulation component is not shown in the curves of the drawings.

The output of cathode-follower unit 20 is supplied to a clamping and sampling circuit 21, which is initially conductive and the output of which may have the form shown in either of curves 2 and 3, depending upon the presence or absence of the pulses shown by curve 13. This output is supplied to a tuned amplifier 22, which is arranged to provide maximum response at the fundamental frequency of the synchronizing component, as indicated by curve 4. After being passed through a phase shifter 23, the purpose of which is to allow minor corrections to be made for phase shifts which may occur in other portions of the system, the phase-shifted sinusoidal wave represented by curve 5 is supplied to a clipper amplifier unit 24 which changes its waveform to have a shape indicated by curve 6. This wave is then passed through wave shaper 25, which in turn produces a substantially square wave of the general form shown by curve 7.

After being passed through a low-pass filter 26 to substantially remove the harmonics, the resultant substantially sinusoidal wave (curve 8) is supplied to a phase converter or multiplier 27. This unit develops a plurality of waves of equally spaced phase but each having the same frequency as the input wave. These output waves are illustrated by curve 9, and are supplied preferably to a radial-beam electron tube unit 28, in which they are utilized to provide a rotating deflecting field. This field rotates at the rate of one revolution for each cycle of the single-phase wave (curve 8) which is supplied to phase converter 27.

The radial-beam electron tube of unit 28 is assumed, for the purpose of example, to have twelve anodes, one corresponding to each interval of the transmitted intelligence signal, and the signal developed on these anodes is illustrated by the group of curves designated 10. These signals are supplied to a mixer unit 29, the output of which comprises a series of equally spaced negative pulses, as represented by curve 11. These pulses pass through a clipper amplifier 30, which shapes them to develop a substantially square wave, represented by curve 12.

The square wave represented by curve 12 is supplied to a peaker unit 31, which develops a series of alternate positive and negative pulses, equally spaced, as represented by curve 13. These pulses are supplied to the clamping and sampling circuit 21, which is affected only by the positive pulses of the train.

The operation of the system of Fig. 1 will now be discussed. First let it be assumed that the system is at rest, that is, the transmitter is emitting no signal of any kind. Under this condition, the system of Fig. 1 is receptive to an input signal, clamping and sampling circuit 21 being in a conductive condition, and radial-beam electron tube unit 28 being at rest, that is, the beam of the electron tube is not rotating. When transmission begins and the transmitted composite signal is received and impressed upon the input of the system of Fig. 1, it passes directly through units 20 and 21, the output of unit 21 under this condition being represented by curve 2. Since unit 22 has its maximum response at the fundamental frequency of the synchronizing component of the composite signal, this component is separated out as represented by curve 4, subjected to the degree of phase shift necessary to compensate for undesired phase shift occurring in other parts of the system, and impressed upon clipper amplifier unit 24 and wave shaper 25, these two units serving to change the substantially sinusoidal wave to a square wave of the same frequency. This square wave is represented by curve 7.

In order to again obtain a sinusoidal wave of the original synchronizing signal fundamental frequency but substantially free from spurious responses, the square wave is passed through low-pass filter 26 which substantially removes the harmonics and provides a sinusoidal wave such as that represented by curve 8. This wave in turn is passed through the phase multiplier unit 27 for the purpose of providing a plurality of waves of equally spaced phase but each having the same frequency as the input wave. These waves are utilized to provide a rotating electrostatic deflecting field in the radial-beam electron tube of unit 28, resulting in the development of a series of equally spaced pulses, one pulse being developed at each anode of the radial-beam electron tube. After being mixed in unit 29 and shaped and peaked in units 30 and 31, the resultant pulses are utilized to actuate clamping and sampling circuit 21. This circuit is initially conductive, remains conductive during each positive pulse supplied to it from peaker unit 31 and becomes non-conductive following each such pulse.

Phase shifter 23 is adjusted so that each positive pulse supplied by peaker unit 31 coincides in phase with one synchronizing interval or segment of the input signal. Under this condition, since the pulses are preferably shorter than the synchronizing component segments, the system remains open and receptive to information being supplied to it during a chosen portion of each of the synchronizing intervals, preferably near the trailing edge thereof, but becomes non-conductive and non-receptive to input signal information occurring outside of this chosen portion. Thus the system is substantially unaffected by the presence or absence of modulation on the intelligence component of the input signal, or to spurious signals due to "jamming" or other causes which may occur in time intervals lying outside those used for transmitting the synchronizing information. Curve 3 illustrates the output of circuit 21 after operation has been initiated.

Figure 5:
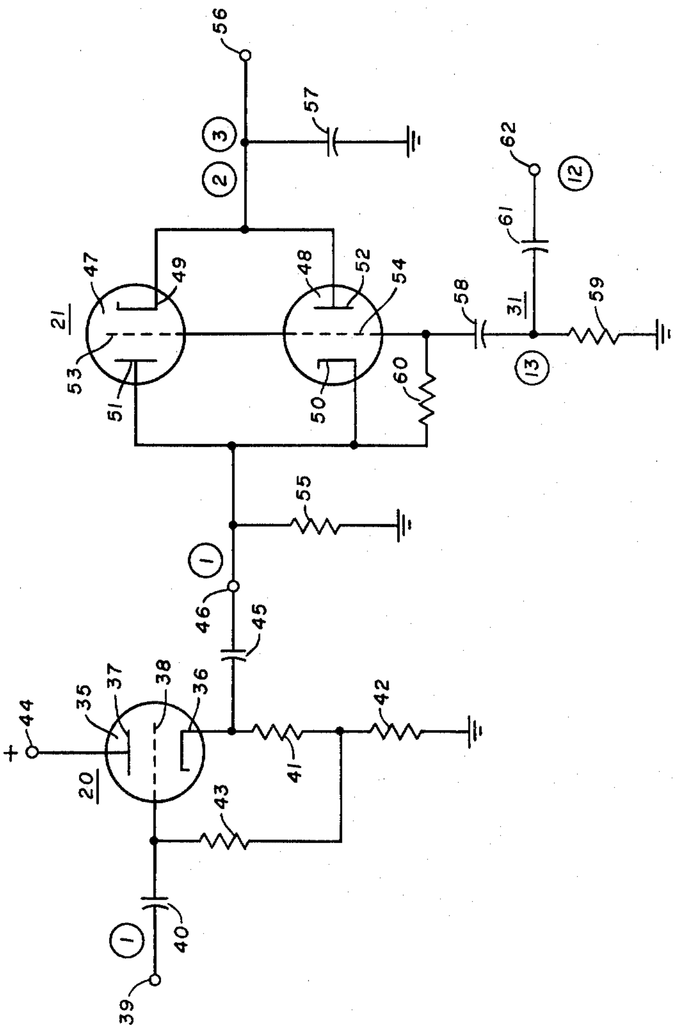
Fig. 5 is a schematic circuit diagram of certain portions of the system of Fig. 1.

Referring now to Fig. 5 of the drawings, there is shown a schematic diagram of units 20, 21 and 31 of the system of Fig. 1. Unit 20 comprises an electron discharge tube 35 having a cathode 36, an anode 37, and a control electrode 38, arranged to operate as a cathode follower. An input terminal 39 is connected through a capacitor 40 to control electrode 38. Cathode 36 is connected to ground through resistors 41 and 42 in series. A resistor 43 is connected between control electrode 38 and the junction of resistors 41 and 42. Anode 37 is connected to a suitable source of positive potential 44. A capacitor 45 is connected between cathode 36 of electron discharge tube 35 and an input terminal 46 of unit 21.

Unit 21 comprises a pair of electron discharge tubes 47 and 48, having respectively cathodes 49 and 50, anodes 51 and 52, and control electrodes 53 and 54. Anode 51 of electron discharge tube 47 is connected to cathode 50 of electron discharge tube 48, and these elements in turn are connected to input terminal 46. A resistor 55 is connected between input terminal 46 and ground. Cathode 49 of electron discharge tube 47 and anode 52 of electron discharge tube 48 are connected together and to an output terminal 56. A capacitor 57 is connected between output terminal 56 and ground.

Control electrodes 53 and 54, respectively of electron discharge tubes 47 and 48, are connected together and, through a network comprising a capacitor 58 in series with a resistor 59, to ground. A resistor 60 is connected between control electrodes 53 and 54 and the connection joining anode 51 and cathode 50. The junction of capacitor 58 and resistor 59 is connected through a capacitor 61 to a terminal 62, to which may be connected a square-wave signal source (see 30 in Fig. 1). Resistor 59 and capacitor 61 comprise peaker unit 31.

In operation, the composite input signal, as represented by curve 1, is applied between input terminal 39 and ground. Unit 20 functions in a conventional manner as a cathode follower, so that this input signal is substantially repeated between input terminal 46 of unit 21 and ground. Assume for the moment that no square-wave signal is being applied between terminal 62 and ground. Electron discharge tubes 47 and 48 are conductive, since their control electrodes 53 and 54 are at a potential near that of their cathodes 49 and 50, due to grid rectification and the resultant slight bias potential developed across resistor 60. Electron discharge tube 47 passes the positive swings of the input wave, while electron discharge tube 48 passes the negative swings thereof. A signal wave is developed between output terminal 56 and ground which has substantially the form shown by curve 2.

Now let it be assumed that a square wave (curve 12) is applied between terminal 62 and ground. Due to the differentiating or peaking action of capacitor 61 and resistor 59, there is developed across resistor 59 a series of sharp pulses represented by curve 13. As shown, each of these pulses is preferably substantially shorter than a synchronizing signal interval (see 15 in curve 1), in order to provide still further rejection of spurious signals such as crosstalk. The negative pulses have no appreciable effect upon the operation of the clamping and sampling circuits and accordingly may be ignored. The positive pulses, however, cause capacitor 58 to be charged in such a manner that control electrodes 53 and 54 of electron discharge tubes 47 and 48 are driven positive relative to their respective cathodes 49 and 50 during the presence of each positive pulse. As soon as each positive pulse ends, capacitor 58 discharges, thus driving control electrodes 53 and 54 negative to such an extent that electron discharge tubes 47 and 48 are rendered non-conductive. Thus it will be seen that clamping and sampling circuit 21 is conductive initially and conductive during the interval of each positive sharp pulse developed across resistor 59, but completely non-conductive in the interval following each such pulse. This is one of the features of the present invention.

From Fig. 5 it will be noted that control electrodes 53 and 54 are returned, through resistor 60, to input terminal 46 of unit 21. Due to this circuit arrangement, the control electrodes tend to follow the signal potentials up and down and hence are always in a condition readily to be rendered first conductive and then non-conductive by positive sharp pulses developed across resistor 59. In other words, the operation of the clamping and sampling circuit is relatively independent of the strength of the input signal, and the circuit is thus adapted to handle a wide range of input signals. This ability is a feature of the present invention, and renders the clamping and sampling circuit especially adapted for use in a synchronizing signal separation system of the type herein contemplated.

An important feature of the invention is the conversion of a sinusoidal synchronizing component to a square wave and then back to a sinusoidal wave. This is done, in accordance with the invention, in order to substantially eliminate spurious responses, such for example as crosstalk from the intelligence component resulting from passing the composite input signal through a link between the transmitting and receiving terminal units having relatively narrow bandwidth. If such spurious signals were permitted to pass through the system, temporary loss of synchronization would result, with serious effect upon intelligibility of the intelligence signal being transmitted and received.

While there has been described what is at present considered the preferred embodiment of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. In a communication system for transmitting and receiving a composite signal having samples of intelligence and synchronizing components in successive time-position sequence, said synchronizing component having a fundamental frequency, means for separating said fundamental frequency comprising the combination of: an initially conductive clamping and sampling circuit having an input and an output terminal; a ground forming a plane of reference potential; said composite signal being connected between said input terminals and said ground; a network having maximum response at said fundamental frequency of said synchronizing component connected between said output terminal and said ground; means connected to said network for developing a square wave having the same frequency as said fundamental frequency; means connected to said last-named means for converting said square wave into a substantially sinusoidal wave; a phase multiplier fed by said sinusoidal wave and adapted to develop a plurality of waves of equally spaced phase but each of the same frequency as said sinusoidal wave; means utilizing said plurality of waves to provide a train of equally spaced pulses, said last-mentioned means comprising a radial-beam electron tube; and means for rendering said clamping and sampling circuit non-conductive following each of said pulses.

2. In a communication system for transmitting and receiving a composite signal having samples of intelligence and synchronizing components in successive time-position sequence, said synchronizing component having a fundamental frequency and comprising a plurality of successive segments amplitude-modulated by said fundamental frequency, means for separating said fundamental frequency comprising the combination of: an initially conductive clamping and sampling circuit having an input and an output terminal; a ground forming a plane of reference potential; said composite signal being connected between said input terminal and said ground; a network having maximum response at said fundamental frequency of said synchronizing component connected between said output terminal and said ground; means connected to said network for developing a square wave having the same frequency as said fundamental frequency; means connected to said last-named means for converting said square wave into a substantially sinusoidal wave; a phase multiplier fed by said sinusoidal wave and adapted to develop a plurality of waves of equally spaced phase but each of the same frequency as said sinusoidal wave; means utilizing said plurality of waves to provide a train of equally spaced pulses; means for bringing said pulses into phase coincidence with the segments of said synchronizing component; and means for rendering said clamping and sampling circuit non-conductive following each of said pulses.

3. In a communication system for transmitting and receiving a composite signal having samples of intelligence and synchronizing components in successive time-position sequence, said synchronizing component having a fundamental frequency, means for separating said fundamental frequency comprising the combination of: an initially conductive clamping and sampling circuit; a network having maximum response at said fundamental frequency of said synchronizing component connected to said circuit; means utilizing the output of said network for developing a square wave having the same frequency as said fundamental frequency; means for converting said square wave into a substantially sinusoidal wave; a phase multiplier utilizing said sinuosidal wave and adapted to develop a plurality of waves of equally spaced phase but each of the same frequency as said sinusoidal wave; means utilizing said plurality of waves to provide a train of equally spaced pulses; and means utilizing said pulses for rendering said clamping and sampling circuit non-conductive following each of said pulses.

4. In a communication system for transmitting and receiving a composite signal having samples of intelligence and synchronizing components in successive time-position sequence, said synchronizing component having a fundamental frequency, means for separating said fundamental frequency comprising the combination of: a ground forming a plane of reference potential; an initially conductive clamping and sampling circuit having an input and an output terminal, said composite signal being connected between said input terminal and said ground; means connected between said output terminal and said ground for developing a square wave having the same frequency as said fundamental frequency; means connected to said last-named means for converting said square wave into a substantially sinusoidal wave; a phase multiplier fed by said sinusoidal wave and adapted to develop a plurality of waves of equally spaced phase but each of the same frequency as said sinusoidal wave; means utilizing said plurality of waves to provide a train of equally spaced pulses; and means for rendering said clamping and sampling circuit non-conductive following each of said pulses.

References Cited in the file of this patent

UNITED STATES PATENTS

| | | |
|---|---|---|
| 2,195,853 | Fitch | Apr. 2, 1940 |
| 2,240,420 | Schnitzer | Apr. 29, 1941 |
| 2,277,000 | Bingley | Mar. 17, 1942 |
| 2,335,265 | Dodington | Nov. 30, 1943 |
| 2,396,211 | Skellett | Mar. 5, 1946 |
| 2,405,231 | Newhouse | Aug. 6, 1946 |
| 2,431,577 | Moore | Nov. 25, 1947 |
| 2,458,599 | Hussey | Jan. 11, 1949 |
| 2,471,168 | Posthumus | May 24, 1949 |
| 2,480,385 | Sebring | Aug. 30, 1949 |
| 2,599,675 | Volz | June 10, 1952 |